United States Patent [19]
Brown et al.

[11] Patent Number: 6,011,784
[45] Date of Patent: *Jan. 4, 2000

[54] COMMUNICATION SYSTEM AND METHOD USING ASYNCHRONOUS AND ISOCHRONOUS SPECTRUM FOR VOICE AND DATA

[75] Inventors: David L. Brown, Lake Worth; Paul D. Marko, Pembroke Pines; Jaime A. Borras, Miami, all of Fla.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/769,026

[22] Filed: Dec. 18, 1996

[51] Int. Cl.[7] .................................................... H04J 3/24
[52] U.S. Cl. ......................... 370/329; 370/350; 370/468
[58] Field of Search .................................... 370/328, 329, 370/330, 336, 341, 345, 337, 347, 348, 350, 437, 442, 465, 468; 455/426, 458, 464, 465

[56] References Cited

U.S. PATENT DOCUMENTS

| | | | |
|---|---|---|---|
| 4,987,571 | 1/1991 | Haymond et al. | 370/445 |
| 5,117,423 | 5/1992 | Shepherd et al. | 370/95.1 |
| 5,329,531 | 7/1994 | Diepstraten et al. | 370/347 |
| 5,412,650 | 5/1995 | Davies | 370/82 |
| 5,428,819 | 6/1995 | Wang et al. | 455/454 |
| 5,504,757 | 4/1996 | Cook et al. | 370/84 |
| 5,515,373 | 5/1996 | Lynch et al. | 370/79 |
| 5,521,928 | 5/1996 | Worsley et al. | 370/67 |
| 5,526,349 | 6/1996 | Diaz et al. | 370/58.1 |
| 5,526,353 | 6/1996 | Henley et al. | 370/60.1 |
| 5,535,207 | 7/1996 | Dupont | 370/80 |

OTHER PUBLICATIONS

A. Capone et al., *IEEE*, "Packet Data Access in DECT Systems", 1996, pp. 839–843.

European Telecommunications Standards Institute, "Radio Equipment and Systems (RES); Digital European Cordless Telecommunications (DECT) Common Interface, Part 1: Overview", ETS 300–175–1, pp. 1–35, 1995.

European Telecommunications Standards Institute, "Radio Equipment and Systems (RES); Digital European Cordless Telecommunications (DECT) Common Interface, Part 2: Physical Layer", ETS 300–175–2, pp. 1–48, 1995.

European Telecommunications Standards Institute, "Radio Equipment and Systems (RES); Digital European Cordless Telecommunications (DECT) Common Interface, Part 3: Medium Access Control Layer", ETS 300–175–3, pp. 1–100, 1995.

*Primary Examiner*—Rickey Ngo
*Attorney, Agent, or Firm*—John G. Rauch; Brian M. Mancini; Michael C. Soldner

[57] ABSTRACT

In a time division, multiple access system, a base station (102) transmits an isochronous beacon (404, 422) at the start of each frame (400), conveying control and timing information. Following the isochronous beacon (404), isochronous time slots (414, 416, 418, 420) are dynamically allocated for communication of isochronous data. After communication of the isochronous data, the remainder of the frame (400) before the next isochronous beacon (422) is used for transmission of packets of asynchronous data. This technique gives priority to the isochronous data, which is real time, while also maximizing the bandwidth allocated for asynchronous data. A single transmitter circuit (124, 158) and receiver circuit (122, 156) at each station are used for communication of both isochronous data and asynchronous data.

15 Claims, 9 Drawing Sheets

COMMUNICATION SYSTEM AND METHOD USING ASYNCHRONOUS AND ISOCHRONOUS SPECTRUM FOR VOICE AND DATA

FIELD OF THE INVENTION

The present invention relates generally to communication systems. The present invention more particularly relates to a communication system and method which uses both synchronous and isochronous bands of the electromagnetic spectrum for communication of both voice and data.

BACKGROUND OF THE INVENTION

Currently, efforts are underway to integrate radio frequency transmission of isochronous data and asynchronous data. Recent changes to rules of the Federal Communications Commission in the United States have prompted these efforts. Similarly, the commercial need to communicate both voice information and data has prompted the search for efficient methods of communication.

Isochronous data is data which is continuously, periodically transmitted and of indeterminate, potentially continuous duration. An isochronous data source outputs data in a continuous data stream, usually at a substantially constant average data rate, possibly in packets or segments of data. Examples include video camera output and telephone voice output. These can be sources of a substantially continuous output of voice data, either analog or digitized. Isochronous data is generally real time data, and must be transmitted either continuously or periodically at uniform duration and period.

Asynchronous data is data which is packetized and is organized in discrete blocks of finite duration. The amount and duration of transmitted asynchronous data is generally variable and unpredictable. An asynchronous data source outputs data randomly or periodically, in variable size blocks or in constant size blocks. Examples include a computer workstation or laptop computer. Asynchronous data is optimally transmitted in contiguous blocks which may readily be stored or buffered for an indeterminate time before or after transmission.

In the United States, the Federal Communications Commission has defined unlicensed spectrum for communication of isochronous data and asynchronous data. The 1910 MHz–1920 MHz and 2390 MHz–2400 MHz bands are reserved for use by asynchronous devices. The 1920 MHz–1930 MHz band is reserved for use by isochronous devices.

However, the differing nature of isochronous data and asynchronous data has to date limited the integrated transmission of both types of data. Protocols which have been developed for communication of one data type do not efficiently communicate both data types.

For example, time division, multiple access (TDMA) communication systems have been developed for communication of voice data. In such systems, communication occurs on one or more frequencies during frames consisting of repeated time slots of uniform time duration and spacing. Each communication unit in the system is assigned a time slot for transmission and reception of digitized voice information. The units all operate synchronously. Examples of such systems are digital cellular telephone systems according to EIA/TIA standards IS-54 and IS-136.

Many such systems make provision for transmission of data other than voice data in assigned time slots. However, because frame definition and time slot duration are uniform, the system is insufficiently flexible to accommodate the variable and unpredictable nature of asynchronous data. Asynchronous data must be transmitted using the uniform-duration time slots and synchronous protocol, which is slow and inefficient. Because the isochronous voice data is real time, transmission of isochronous data cannot be interrupted beyond the predefined time slotting of the voice channel to permit efficient transmission of asynchronous data. Conventional systems lack the ability to efficiently communicate both asynchronous data and isochronous data.

Accordingly, there is a need in the art for an apparatus and method for integrated RF communication of asynchronous data and isochronous data such as voice information.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF A PREFERRED EMBODIMENT

Figure 1:
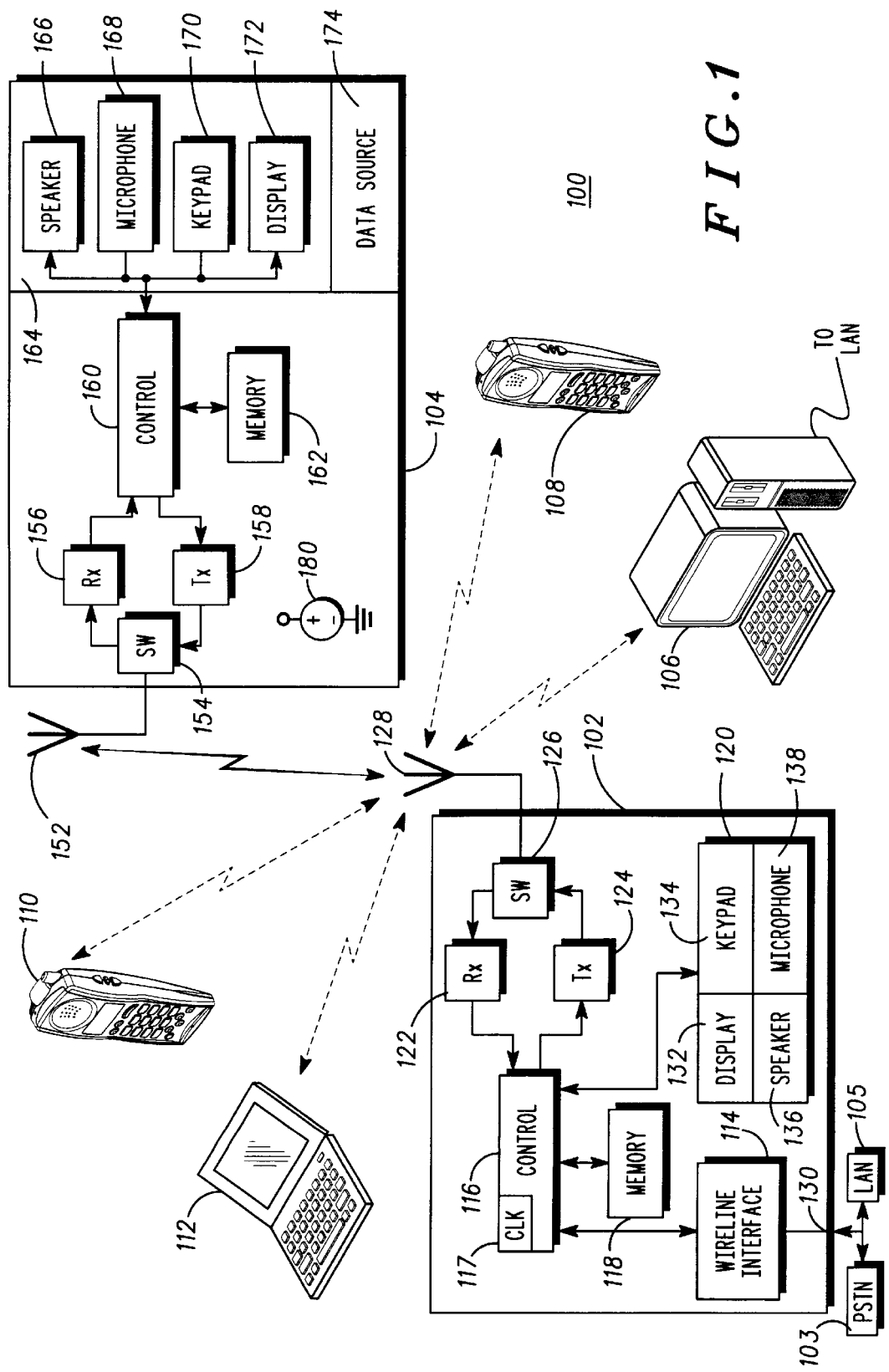
FIG. 1 is a block diagram of a communication system.

Referring now to FIG. 1, a communication system 100 includes at least one base station 102 and at least one mobile station, such as mobile station 104, mobile station 106, mobile station 108, mobile station 110 and mobile station 112. The communication system 100 may include any number of base stations and any number of mobile stations. The number illustrated in FIG. 1 is arbitrarily chosen to illustrate one embodiment of such a system. The communication system 100 is configured for radio communication between the base station 102 and each of the mobile stations.

Radio communication in the communication system 100 occurs according to a standard protocol. Examples of such a standard protocol include the Digital European Cordless Telephone (DECT) protocol, the Personal Handy Phone system (PHS) protocol, the Wireless Customer Premises Equipment protocol (WCPE) or any other protocol suitable for conveying data and other information. For illustration, the communication system 100 is described herein as operating according to a protocol similar to the DECT protocol. However, this description is illustrative only and it is to be recognized that the principles of the system described herein may be applied to a wide variety of systems.

The base station 102 provides an interface between radio communication with the mobile stations and wireline communication with a telephone network, local area network or other data source. The base station 102 includes a wireline interface 114, a controller 116, a memory 118, a user interface 120, a base receiver or a receiver circuit 122, a base transmitter or a transmitter circuit 124, an antenna switch 126 and an antenna 128. The wireline interface 114 is coupled to an input 130 which is configured for coupling to external data sources, such as a public switched telephone network PSTN 103 or local area network or LAN 105. The wireline interface 114 provides functions such as tone generation for dual tone, multi-frequency (DTMF) dialing and detection of an incoming ringing signal from the telephone network. The wireline interface 114 also communicates signals representative of speech between the telephone network and the controller 116 and communicates signals representative of asynchronous data between the local area network and the controller 116.

The controller 116 controls the operation of the base station 102. The controller 116 may be any suitable processor or microcontroller. The controller 116 stores data in the memory 118 and operates in response to data and instructions stored in the memory 118. The controller 116 includes a clock 117 for establishing a time base. Other stations in the communication system 100 preferably take their timing from the time base of the base station 102 so that all elements are synchronized. The base station 102 includes numerous control connections which couple the controller 116 and other elements of the base station 102. Not all of these control connections are shown in FIG. 1 so as to not unduly complicate the drawing figure.

The user interface 120 includes a display 132, a keypad 134, a speaker 136 and a microphone 138. The display 132 is any suitable display, such as a liquid crystal display (LCD) or light emitting diode (LED) display. The keypad 134 includes a standard telephone keypad or typewriter-style keyboard and may include other function keys as well. The user interface 120 provides operation of the base as a hands free speakerphone using the speaker 136 and the microphone 138 and provides dialing and operation of the base station 102 using the display 132 and the keypad 134. For some applications, the base station 102 may omit the user interface 120, for example in less expensive or low tier cordless telephone models. Also, the communication system 100 may include other base stations which include features other than the user interface 120 but still provide the function of communication between a wireline interface and a radio interface.

The receiver circuit 122 and the transmitter circuit 124 provide radio communication for the base station with one or more handsets of the plurality of handsets. Upon reception of RF signals, the base station 102 receives radio frequency (RF) signals through the antenna 128. The antenna 128 converts the RF signals into electrical baseband signals. The receiver circuit 122 demodulates the electrical baseband signals, recovers the data transmitted on the RF signals and produces a serial data stream. This serial data stream is converted to clocked data and is provided to the controller 116. The controller 116 formats the data into recognizable voice or information for use by the user interface 120 or for transmission to the wireline interface 114. The user interface 120 communicates the received information or voice to a user. Similarly, the wireline interface 114 communicates the received information or voice to the PSTN 103 or LAN 105.

Upon transmission of radio frequency (RF) signals from the base station 102, the controller 116 receives user input data from the user interface 120 and receives wireline information from the wireline interface 114. The controller 116 formats the information obtained from the user interface 120 and conveys it to the transmitter circuit 124 for conversion into modulated RF signals. The transmitter circuit 124 conveys the RF modulated signals to the antenna 128 for transmission to the base station 102. The antenna switch 126 selectively couples either the receiver circuit 122 or the transmit circuit 124 to the antenna 128.

In accordance with the present invention, both the receiver circuit 122 and the transmitter circuit 124 are configured for communicating both asynchronous data on an asynchronous frequency band and isochronous data on an isochronous frequency band. Asynchronous data is data which is packetized and is organized in discrete blocks of finite duration. The amount and duration of transmitted asynchronous data is generally variable and unpredictable. Isochronous data is real-time data which transmitted continuously or periodically and is of indeterminate, potentially continuous duration. An isochronous data source outputs data in a continuous data stream, usually at a substantially constant average data rate. Examples include video camera output and telephone voice output.

It is envisioned that isochronous data will be communicated on an isochronous band and asynchronous data will be communicated on an asynchronous band. For example, in the United States, the Federal Communications Commission has defined unlicensed spectrum for communication of isochronous data and asynchronous data. The 1910 MHz–1920 MHz and 2390 MHz–2400 MHz bands are reserved for use by asynchronous devices. The 1920 MHz–1930 MHz band is reserved for use by isochronous devices. However, in particular applications, the isochronous band and the asynchronous band may overlap or coincide.

Each mobile station includes similar radio circuitry for communicating with the base station 102. Structure and operation of a mobile station in conjunction with the base station 102 will be described using mobile station 104 as an example. However, mobile station 106, mobile station 108, mobile station 110 and mobile station 112 operate to provide radio communication in a manner substantially identical to mobile station 104.

Mobile station 104 may be any device remotely located from the base station 102 and configured for radio communication with the base station 102. Examples include a cordless telephone handset, such as mobile station 108 and mobile station 110, a portable computer such as mobile station 112, a computer workstation configured for wireline communication such as mobile station 106 or a personal digital assistant (PDA) which includes a touch-sensitive display for data entry and display as well as wireless and wireline capabilities.

In accordance with the present invention, one or more mobile stations is configured for communicating both isochronous data, such as voice data, and asynchronous data such as data files, software programs or other data of indeterminate amount and origin. Thus, for example, a portable computer such as mobile station 112 may communicate asynchronous data such as data files and may also include user interface elements such as a microphone and speaker for communication of isochronous data such as voice data. Similarly, a cordless telephone handset such as mobile station 110 may communicate isochronous data such as voice data, and may also communicate asynchronous data in the form of data files for use by a user. Thus, mobile station 104 as herein described may be configured in accordance with user requirements to provide the operational features of any of these mobile stations, as well as other features required by a user.

The mobile station 104 includes an antenna 152, an antenna switch 154, a receiver circuit 156, a transmitter circuit 158, a controller 160, a memory 162, a user interface 164 and a battery 180. Upon reception of RF signals from the base station 102, the mobile station 104 receives the RF signals through the antenna 152. The antenna 152 converts the RF signals into electrical baseband signals. The receiver circuit 156 demodulates the electrical baseband signals, recovers the data transmitted on the RF signals and provides clocked data to the controller 160. The controller 160 formats the data into recognizable voice or information for use by the user interface 164. The user interface 164 communicates the received information or voice to a user. For portable operation, the battery 180 provides energy to power the mobile station 104.

The user interface 164 includes a speaker 166, a microphone 168, a keypad 170, and a display 172. The speaker 166 and the microphone 168 are conventional and convert between audible speech or other audio information and electric signals representative of the audio information. The keypad 170 includes a standard telephone keypad or typewriter-style keyboard and may include other function keys as well. The display is a multiple line display and in particular embodiments is a liquid crystal display (LCD), a light emitting diode (LED) display, a cathode ray tube (CRT) video display, a flat panel display or any other suitable display.

The mobile station 104 also includes a data source 174. The data source 174 is any source of asynchronous data, such as a memory in a portable computer or computer workstation or a wireline source of data such as a local area network. The asynchronous data is data to be conveyed via RF signals from the mobile station 104 to the base station 102.

Upon transmission of radio frequency (RF) signals from the mobile station 104 to the base station 102, the user interface 164 transmits user input data to the controller 160. The controller 160 formats the information obtained from the user interface 164 and transmits it to the transmitter circuit 158 for conversion into modulated RF signals. The transmitter circuit 158 conveys the RF modulated signals to the antenna 152 for transmission to the base station 102.

In accordance with the present invention, both the receiver circuit 156 and the transmitter circuit 158 are configured for communicating both asynchronous data on an asynchronous band and isochronous data on an isochronous band. Communication of asynchronous data and isochronous data within the communication system 100 is according to a communication protocol, to be described below.

Figure 2:
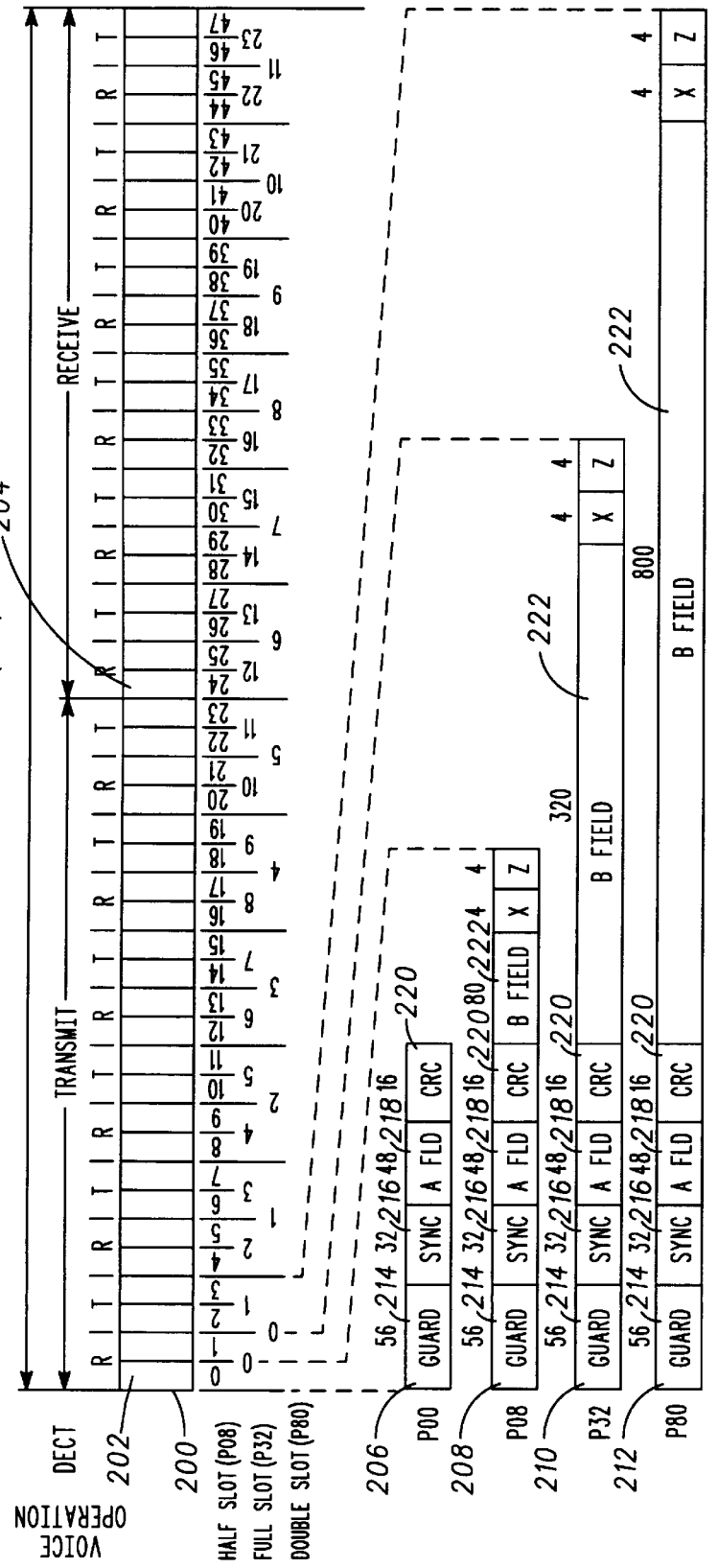
FIG. 2 is a diagram illustrating frame structure of a prior art communication protocol.

Referring now to FIG. 2, it shows the structure of a frame 200 for communication according to the DECT specification. DECT is a time division, multiple access (TDMA) system using time division duplexing (TDD). Each frame such as frame 200 is divided into 24 full slots as is shown in FIG. 2. Generally, full slots 0 through 11 are used for communication from a base station to a mobile station and full slots 12 through 23 are used for communication from the mobile station to the base station. A typical full duplex link is located on slots one-half frame apart. Thus, if a transmit full slot, such as slot 202 in FIG. 2 is located at slot 0, the receive full slot would be at full slot 12, designated slot 204 in FIG. 2. The frame 200 totals 11,520 bits and is typically 10 msec. in duration.

Data is transmitted using physical packets. Physical packets are of the following types: short packet 206, designated P00 in FIG. 2; low capacity packet 208, designated P08 in FIG. 2; basic packet 210, designated P32 in FIG. 2; and high capacity packet 212, designated P80 in FIG. 2. Each packet includes a number of common fields, including a guard field 214, typically 56 bits in length; a synchronization field 216, typically 32 bits in length; an A-field 218, typically 48 bits in length, and a cyclical redundancy check or CRC field 220, typically 16 bits in length. Each packet may further include other fields, labeled X and Z in FIG. 2, for collision detection and other functions. These common fields are used for DECT signalling information.

In addition to the signalling information fields, the basic packet 210, the low capacity packet 208 and the high capacity packet 212 include a B-field 222. The B field contains user data for communication between the base station and the mobile station. The low capacity packet 208 includes bits sufficient to establish a data rate of 8 kbps. The basic packet 210 includes bits which establish a data rate of 32 kbps. The high capacity packet includes bits which establish a data rate of 80 kbps. In a DECT system, the B field typically contains voice data.

Figure 3:
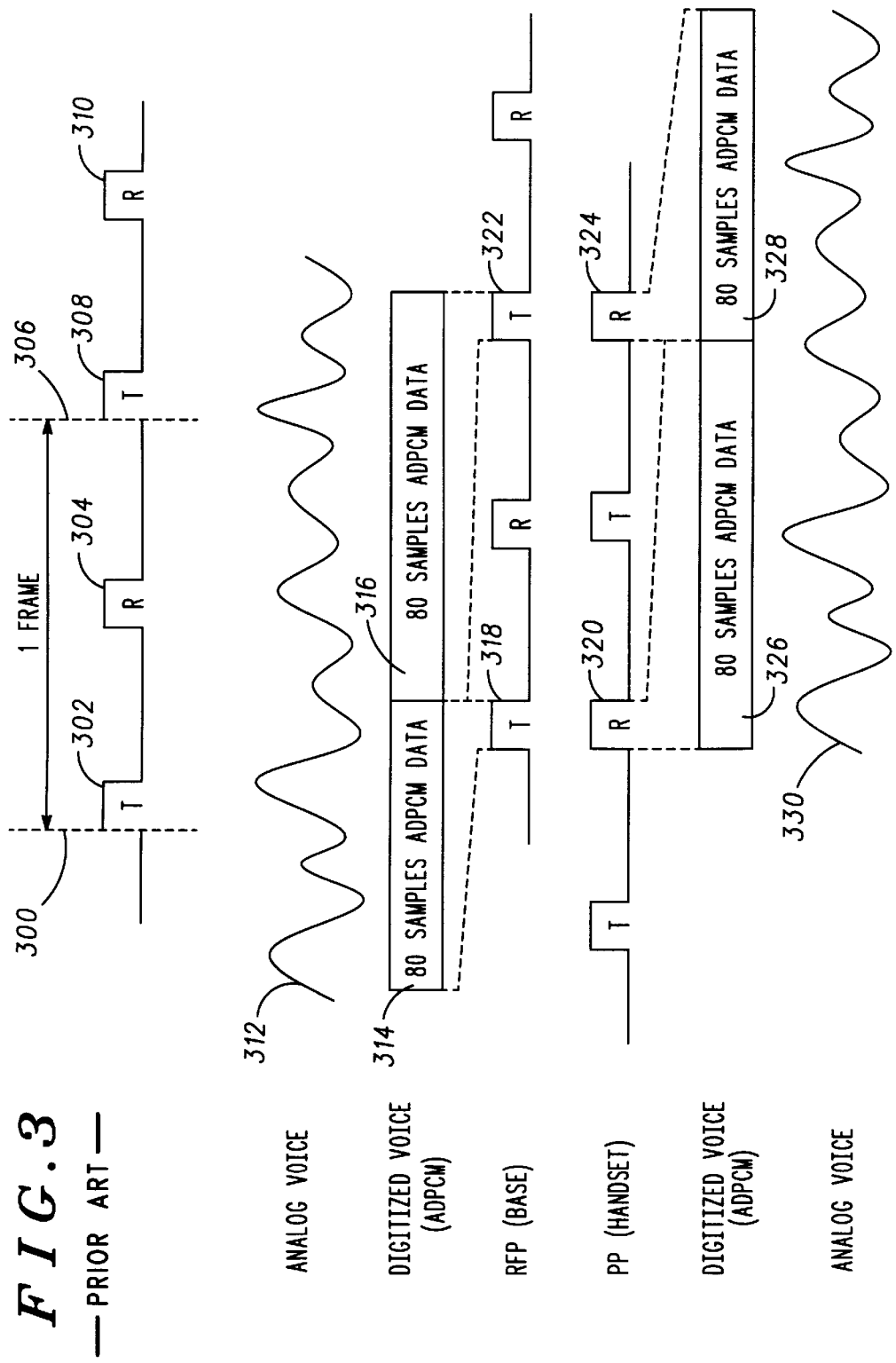
FIG. 3 is a diagram illustrating digital encoding, time slotting, communication and decoding using the prior art communication protocol of FIG. 2.

FIG. 3 is a diagram illustrating digital encoding, time slotting, communication and decoding of voice data using the DECT protocol of FIG. 2. FIG. 3 illustrates a method of communicating isochronous data such as voice data using a known TDMA system. In FIG. 3, a frame 300 includes a transmit slot 302 for communication from a first station to a second station and a receive slot 304 for reverse communication, from the second station to the first station. The transmit slot 302 and the receive slot 304 create full a duplex link between the first station and the second station. The transmit slot 302 and receive slot 304 are preassigned for each frame. Slot assignment is determined by the base station and transmitted to the mobile station at initiation of communication between the base and mobile stations The frame 300 is followed by another frame 306 containing a transmit slot 308 and receive slot 310 for the first and second stations.

An analog voice sample 312 is digitized and encoded as an Adaptive Digital Pulse Code Modulated (ADPCM) signal of 80 data samples, including first voice data 314 and second voice data 316. If the analog speech signal continues in time, additional voice data will be digitized and encoded. The voice data is isochronous data in that it is real time data, continuously and periodically transmitted.

The first voice data 314 is transmitted from a base station or radio fixed part (RFP) during a first transmit slot 318. It is received at a mobile station or handset or portable part (PP) during a first receive frame 320. Similarly, the second voice data 316 is transmitted from the base station during a second transmit frame 324 and received at the mobile station. The first received data 326 and second received data 328 are substantially identical to the first voice data 314 and the second voice data 316, respectively, barring any errors during communication. One slot of data is transmitted per frame.

At the mobile station, the first received data 326 and second received data 328 are decoded to form received analog voice sample 330, which is substantially identical to analog voice sample 312. Differences between received analog voice sample 330 and analog voice sample 312 are due to errors during communication and estimation errors during encoding and digitization.

In this manner, isochronous data such as voice data is encoded and transmitted. During each transmit slot 318, 322, ten milliseconds of analog voice signal is encoded, transmitted and communicated as a basic packet or P32 packet. The standard DECT structure illustrated in FIGS. 2–3 is well-adapted to communicating continuous data such as voice data between the first station and the second station. Similar TDMA voice transmission protocols, such as IS-54 and IS-136 for digital cellular systems in the U.S. and GSM for digital cellular in Europe and other locations, provide similar communication capability for isochronous data.

However, such TDMA systems are not well suited for transmission of asynchronous data. Use of the DECT basic packet or P32 packet limits data transmission to, at most, 32 kbps. A single packet of data is transmitted between base station and mobile station during a single assigned time slot in each frame. Because the base station may be communicating with other mobile stations during the other time slots of the frame, the mobile station may not communicate with the base station during any other slots. Thus, the transmission of asynchronous data in such a system is limited by the amount of data that can be transmitted during a single slot in a frame.

Figure 4:
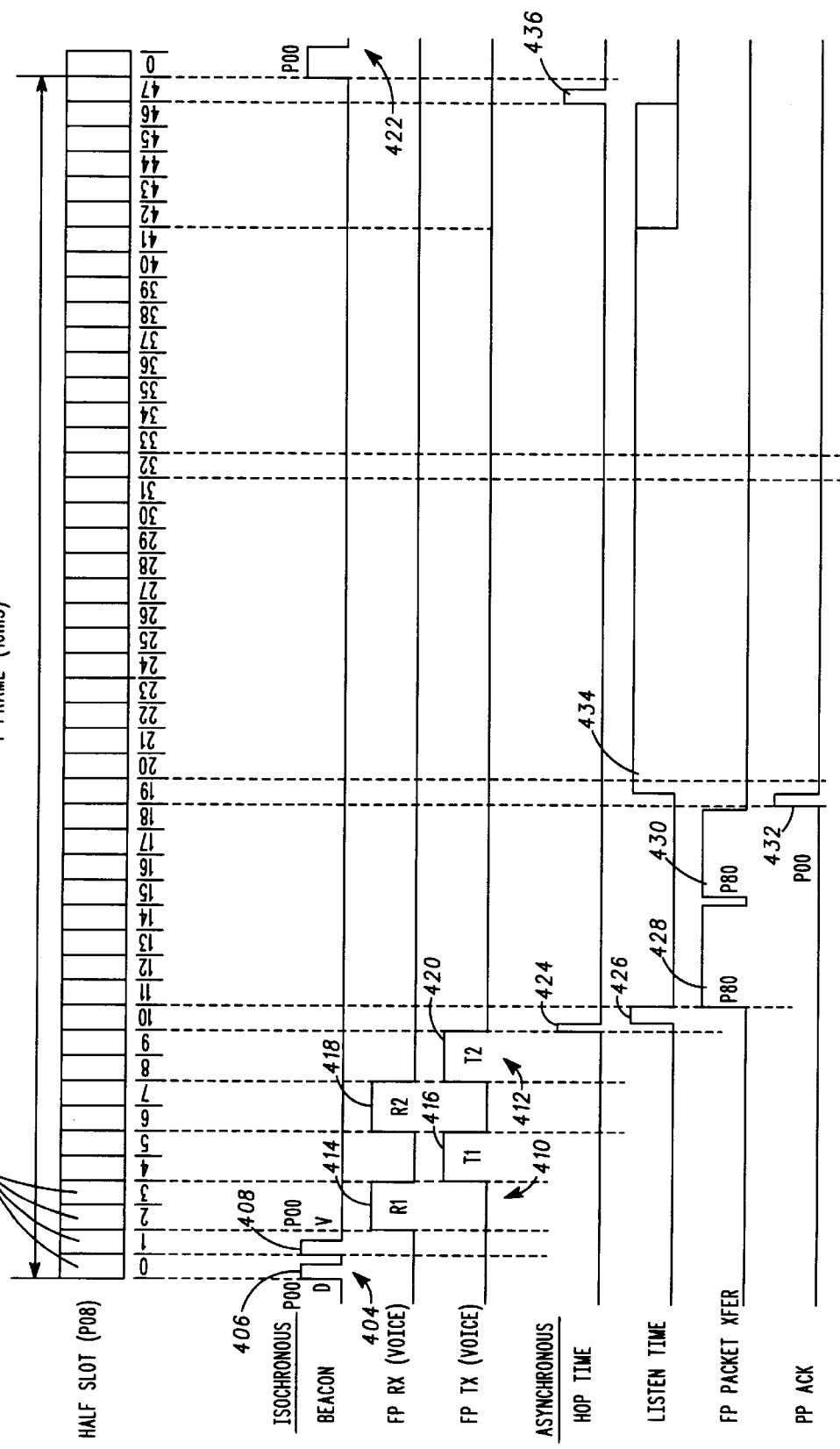
FIG. 4 is a timing diagram illustrating communication of asynchronous data and isochronous data in the communication system of FIG. 1 in accordance with the present invention.

FIG. 4 is a timing diagram illustrating communication of asynchronous data and isochronous data in the communication system 100 of FIG. 1 in accordance with the present invention. In FIG. 4, a frame 400 is divided into 48 half slots 402. Two such half slots form a full slot, similar to the DECT system illustrated in FIG. 2. However, the frame 400 could be divided into any convenient number of slots.

In accordance with the present invention, an isochronous beacon 404 is transmitted by the base station (also referred to as the fixed part or FP). The base station broadcasts the isochronous beacon at a predetermined frequency. For example, in the U.S., spectrum in the 1920–1930 MHz band is reserved for asynchronous data transmission. The isochronous beacon is broadcast at a predetermined frequency in this band. All mobile stations (also referred to as portable parts or PP) listen for the isochronous beacon 404. The isochronous beacon 404 may be transmitted at any predetermined time during the frame 400. Preferably, the isochronous beacon 404 is broadcast at or near the beginning of the frame 400.

In the illustrated embodiment, the isochronous beacon 404 includes a data beacon 406 and a voice beacon 408. As will be recognized, the data beacon 406 and the voice beacon 408 could be combined as a single beacon. Each respective beacon contains control information, such as the identity of the broadcasting base station, paging information which identifies the intended recipient mobile station, timing information and other information. In an exemplary embodiment, the data beacon 406 and the voice beacon 408 each comprise a packet such as a P00 short packet 206 (FIG. 2). Such a packet contains the minimum information necessary for the beacon, including synchronization information in the synchronization field 216, paging and other control information in the A-field 218 and error checking information in the CRC field 220. A mobile station receiving such a packet can check for errors in the received data, synchronize local timing to the base station and respond to the paging information and other control information. Thus, the isochronous beacon 404 alerts mobile stations of the status of the base station and alerts other protocol equipment not related to the beacon that the spectrum is occupied.

Further in accordance with the present invention, the isochronous beacon 404 is followed by one or more isochronous time slots allocated for isochronous communication. In the exemplary embodiment illustrated in FIG. 4, two time slot pairs, including a first slot pair 410 and a second slot pair 412 are allocated. The first slot pair 410 is located in the first time slot immediately following the isochronous beacon 404. The first slot pair 410 includes a receive slot 414 and a transmit slot 416. The first transmit slot 416 is defined to be the first time slot immediately following the first receive slot 414, implementing a receive-then-transmit voice structure referenced to the base station. The first slot pair 410 is allocated for isochronous data communication, such as voice communication, between the base station and a first mobile station. The isochronous time slots have predetermined timing and slot structure, such as is indicated for a DECT system in FIG. 2. Thus, each slot pair corresponds to a voice channel or, more generally, an isochronous data channel.

In a similar manner, the second slot pair 412 is allocated for isochronous data communication between the base station and a second mobile station. The second slot pair 412 includes a second receive slot 418 and a second transmit slot 420, with the second transmit slot 420 immediately following the second receive slot 418. In this manner, isochronous data is communicated during one or more isochronous time slots, such as first receive slot 414 and first transmit slot 416, following the broadcasting of the isochronous beacon 404.

Each of the time slots in the exemplary embodiment occupies a full slot and may comprise a P32 basic packet 210 (FIG. 2). Other configurations and implementations are possible. However, arranging the transmit and receive packets for all duplex links at the beginning of the frame 400 ensures that, once isochronous communication is completed in the frame, the remainder of the frame is available for asynchronous communication.

In accordance with the present invention, the slot pairs or isochronous data channels are dynamically allocated as needed. In the exemplary embodiment illustrated in FIG. 4, two slot pairs are allocated to meet current system demands for voice channels. At a subsequent time, other voice channels may be required, up to 12 channels using the 24 slot frame 400 illustrated. At least one slot pair and voice channel should always be allocated for the base station to receive incoming call requests from a mobile station during the first receive slot 414.

Following the isochronous data time slots, slots are allocated for communication of asynchronous data. Preferably, all remaining slots in the frame 400 are allocated to asynchronous data. This allocation method gives preference to isochronous data, ensuring that a channel is available for communication of such real time data before communicating asynchronous data. However, this allocation method also allows maximization of bandwidth for communication of asynchronous data.

Following the communication of isochronous data during the isochronous time slots, asynchronous data is communicated until the isochronous beacon is next broadcast. A next isochronous beacon 422 is broadcast at the start of the frame following frame 400.

After the last isochronous time slot, in FIG. 2, second transmit slot 420, the communication system changes to communication of asynchronous data. A hop time 424 is established to allow time for the transmitter and receiver of equipment in the system to change from the isochronous band to an asynchronous band, for example the 1910–1920 and 2390–2400 MHz bands in the U.S. In the preferred embodiment, the base station is provided with a transmitter and receiver configured for communicating on both the isochronous band and the asynchronous band; similarly, the mobile station is provided with a single transmitter and a single receiver configured for communicating on both the isochronous band and the asynchronous band. The hop time 424 preferably begins at the start of the high capacity packet 428 immediately following the last isochronous time slot, second transmit slot 420 in FIG. 2. If spectrum is allocated which allows both isochronous and asynchronous communication in the same band, the hop time 424 may be omitted.

After the hop time 424 is a listen time 426. In the U.S., regulations of the Federal Communications Commission require a listen before receive protocol for the asynchronous and isochronous bands. Accordingly, the remainder of the slot containing the high capacity packet 428 that includes the hop time 424 is assigned to the listen time 426. If not required or not necessary, the listen time 426 may be omitted and the high capacity packet 428 used for communication of asynchronous data.

Following the listen time 426, if no other stations in the communication system are transmitting, the base station begins transmitting asynchronous data. In the exemplary embodiment, using the DECT protocol, a P80 high capacity packet 428 is used to communicate the data. The P80 format allows maximum bandwidth because two full slots are used for transmission (corresponding to the half slots designated 11, 12, 13 and 14 in FIG. 2). As is illustrated in FIG. 2, the P80 packet allows the greatest ratio of data bits (the B-field 222) to control bits (including guard field 214, synchronization field 216, A-field 218 and CRC field 220). The P80 high capacity packet 428 also includes signalling information to identify the intended receiver and to identify the last packet transmitted.

In the exemplary embodiment of FIG. 2, the P80 high capacity packet 428 is followed by another P80 high capacity packet 430. Since, in this example, the P80 high capacity packet 430 is the last packet transmitted, it will include an end of transmission indicator for example, in the A-field. In response to receipt of the last P80 high capacity packet 430, the receiving station will respond with an acknowledgment message 432, or ACK. Alternatively, if the receiving station detected errors in the received data, the receiving station may transmit a no-acknowledgment or NACK message.

Following acknowledgment of the received data, the stations in the system enter a second listen time 434, awaiting data transfer from another device in the system. At the end of the frame 400, another hop time 436 is established to allow receivers and transmitters in the system to switch from the asynchronous band to the isochronous band for transmission and reception of the next isochronous beacon 422.

By its nature, asynchronous data is unpredictable in amount and duration. Therefore, the amount of data requiring transmission may require more than two P80 high capacity packets, as illustrated in FIG. 2. The data may require packets to fill the rest of the frame 400, or extend into subsequent frames. Even if the data require subsequent frames, at the end of the frame 400 and each subsequent frame, the equipment in the system switches back to the isochronous band for broadcasting of the isochronous beacon 422. If isochronous time slots are required for communication of isochronous data, such isochronous time slots are allocated at the beginning of the subsequent frame and the isochronous data is communicated. After the isochronous time slots, equipment in the system switches back to the asynchronous band to resume communication of the asynchronous data.

As illustrated in FIG. 4, then, the method according to the present invention allows communication between a first station and a second station of isochronous data followed by asynchronous data. While the first and second stations are described herein as being a base station and mobile station, they may be any suitable station in the system able to establish communication with another station in the system.

Figure 5:
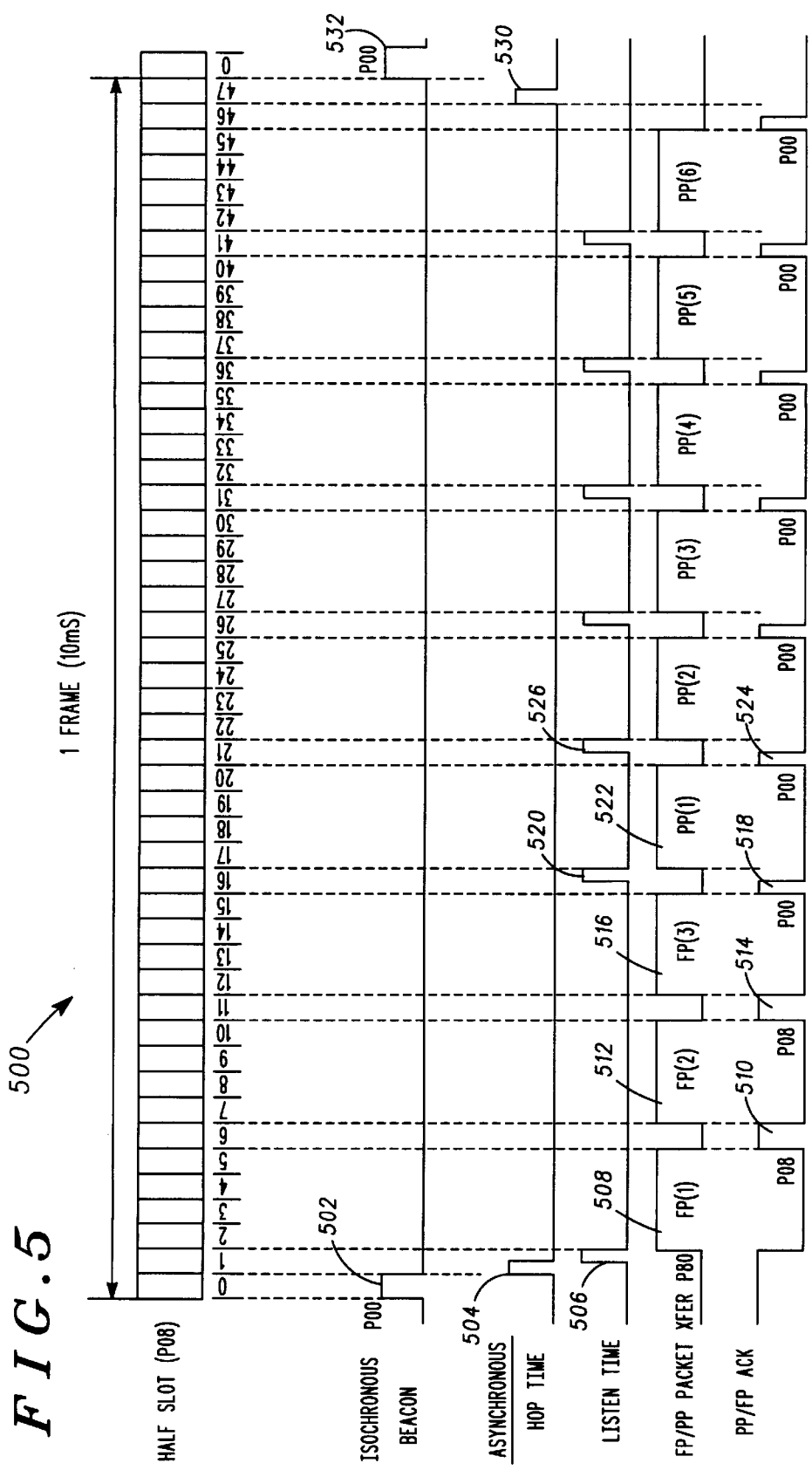
FIG. 5 is a timing diagram illustrating communication of data in the communication system of FIG. 1.

The basic method according to the present invention may be extended to other applications as well. FIG. 5 is a timing diagram illustrating another example of communication of data in the communication system 100 of FIG. 1. In FIG. 5, a base station transmits asynchronous data to three mobile stations (designated FP(1), FP(2) and FP(3) in FIG. 5), then receives information from six different mobile stations. At the beginning of a frame 500, the base station transmits on the isochronous band an isochronous beacon 502. Following a hop time 504 to switch to the asynchronous band and a listen time 506 to receive other transmissions, the base station begins transmission of asynchronous data. Preferably, the base station has priority of transmission at the start of the frame 500. That is, all mobile stations in the system wait to see if the base station transmits before any mobile station transmits.

A first P80 packet 508 is transmitted to a first mobile station. In the preferred embodiment, the control information in the first P80 packet 508 contains an indicator that the base station has additional packets to transfer. After receiving the first P80 packet 508, the first mobile station responds with an acknowledge message 510. In response to the indicator, the mobile station transmits the acknowledge message 510 in a P08 packet which occupies all remaining time in the time slot, preventing other devices in the communication system from transmitting. After receiving the acknowledge message 510, the base station transmits a second P80 packet 512 to a second mobile station, again with the indicator that the base station has additional packets to transfer. The base station then awaits the acknowledge message 514. Again, the receiving mobile station transmits the acknowledge message 514 in a P08 packet. The base station then transmits a third P80 packet 516, this time with an indicator that the packet is the last packet to be transferred. The base station then awaits the acknowledge message 518. This time, the receiving mobile station detects the last packet indicator and transmits the acknowledge message 518 in a P00 packet. The P00 packet allows other stations in the system to detect that the channel is now available.

After receiving the acknowledge message 518, the base station enters a listen time 520 to await receipt of a communication from another station in the system. A mobile station detects the free channel and transmits a P80 packet 522 to the base station. The P80 packet 522 contains a last packet indicator. The base station, after receiving the P80 packet 522 sends an acknowledgment message 524, again as a P00 packet, then enters a listen time 526. This allows other mobile stations to respond on subsequent time slots. This packet transmission continues until the end of the frame 500, at the hop time 530, when the base station switches back to the isochronous band to transmit the next isochronous beacon 532.

Figure 6A:
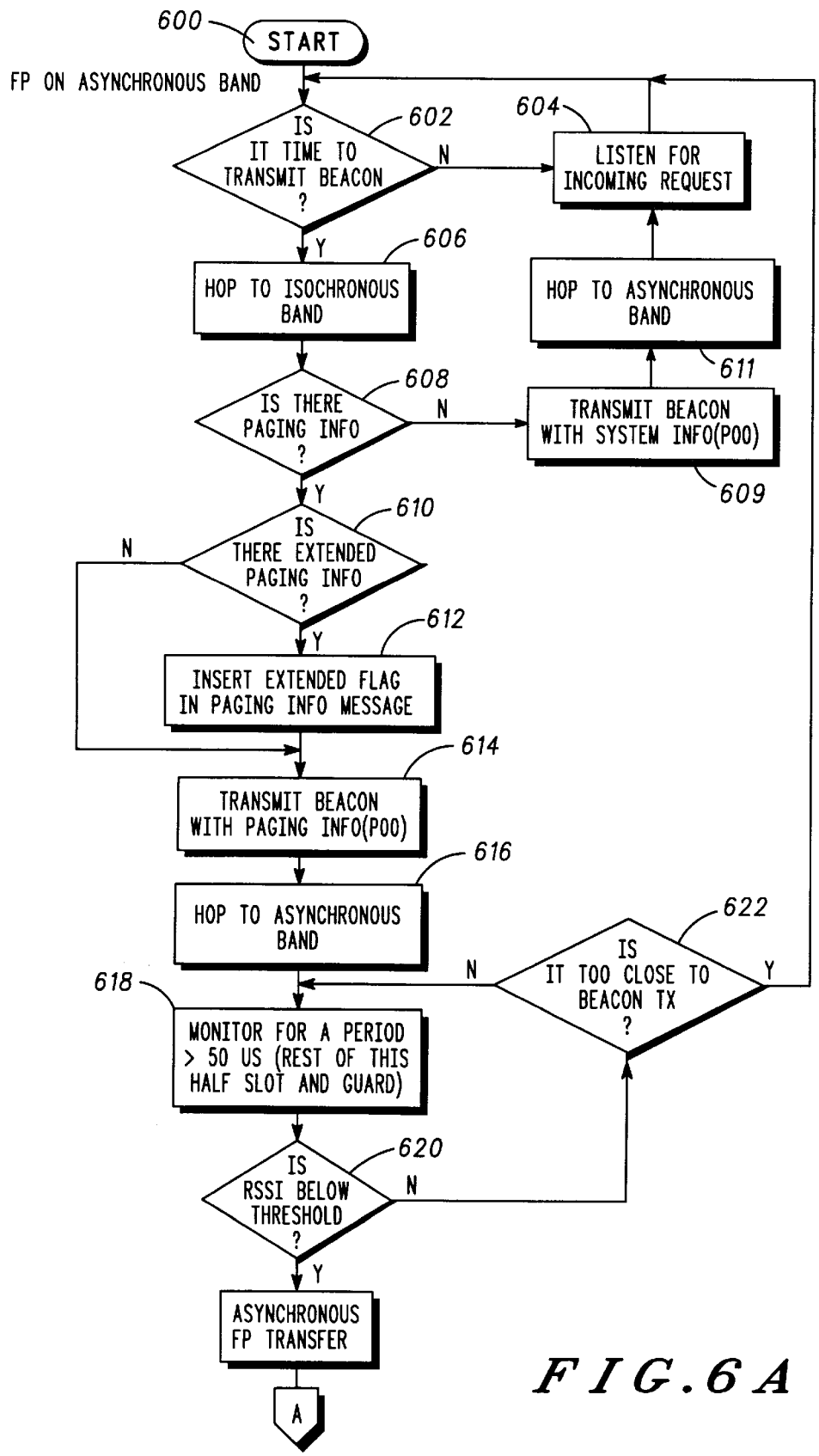
FIGS. 6A and 6B are a flow diagram illustration operation of a base station in the communication system of FIG. 1.

FIG. 6A is a flow diagram illustrating a method of operating a base station in the communication system 100 of FIG. 1. The method begins at step 600 with the transmitter and receiver of the base station (or fixed part or FP) tuned to the asynchronous band. At step 602, the base station determines if it is time to transmit the isochronous beacon. This time is determined using the time base established, for example, by the clock 117 of the base station 102. As illustrated in FIG. 4, the isochronous beacon is preferably transmitted at the beginning of a frame such as frame 400.

At step 604, if it is not time to transmit the beacon, at step 604 the base station listens for incoming requests from other stations in the system. Such requests include, for example, a request to place an outgoing call. The method remains in the loop formed by step 602 and step 604 until receipt of an incoming request or until it is time to transmit the isochronous beacon.

At step 606, having determined that it is time to transmit the isochronous beacon, the base station hops to the isochronous band. If spectrum for isochronous and asynchronous communications is allotted in the same band, step 606 is omitted.

At step 608, the base station determines if there is paging information for insertion in the isochronous beacon. Paging information is predetermined data addressed to a particular mobile station in the communication system to provoke a response in the mobile station. For example, in some situations, the paging information informs the particular mobile station of an incoming call for the mobile station. If there is no paging information, at step 609 the base station transmits the isochronous beacon using, for example a P00 short packet. At step 611, the base station hops to the asynchronous band.

At step 610, the base station determines if there is extended paging information for insertion in the isochronous beacon. Extended paging information is information that requires more than a single frame to transmit. If extended paging information is to be transmitted, a flag or some other indicator is included in the transmission so all mobile stations monitoring the transmission remain awake to continue monitoring the extended paging information, rather than entering a low power sleep mode. If there is no extended paging information, control continues at step 614. If so, an extended flag is included in the paging information in step 612 to alert the mobile station of the extended paging information. At step 614, the mobile station transmits the isochronous beacon using, for example, a P00 short packet.

At step 616, after transmitting the isochronous beacon, the transmitter of the base station hops back to the asynchronous band. At step 618, the base station monitors the asynchronous band during a listen time for incoming transmissions, implementing the listen before receive protocol required by regulations of the United States Federal Communications Commission. At step 620, the base station determines if received signal strength (RSSI) is below a predetermined threshold. The RSSI indication is provided by the receiver of the base station. RSSI is an indicator of other transmissions on the channel. If RSSI is not below the threshold, another station in the communication system may be trying to transmit to the base station. At step 622, the base station determines if the current time is too close to the time for transmission of the next beacon. If so, control returns to step 602 to begin transmitting the isochronous beacon. If not, control returns to step 618 to monitor the asynchronous band until the end of the current slot time. If at step 620, the RSSI was below the threshold, the base station begins transfer of asynchronous data.

Figure 6B:
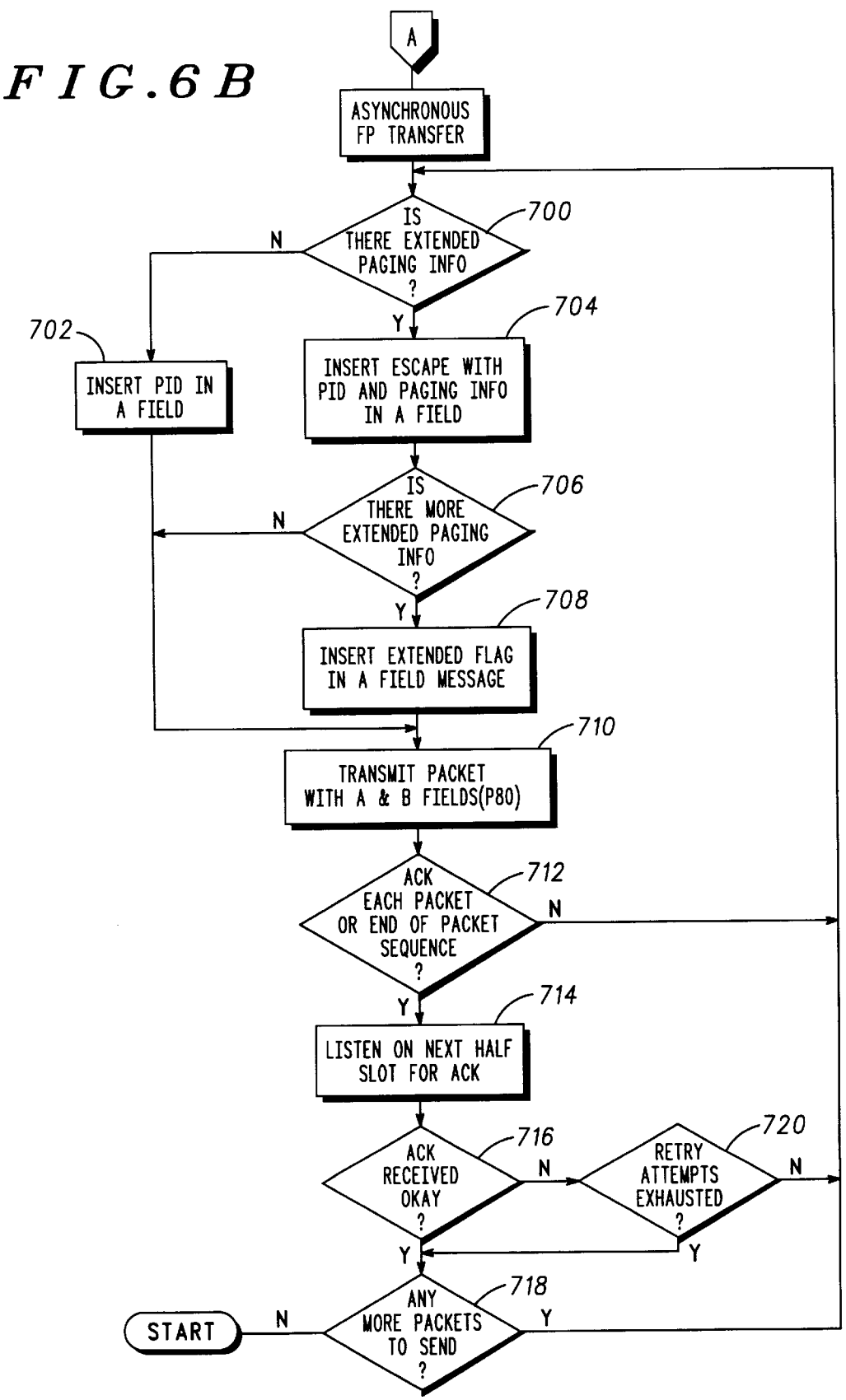

Referring to FIG. 6B, it shows a method of operating the base station to transfer asynchronous data to a mobile station. The base station initially formats the message including the A-field which contains control information and the B-field which contains the asynchronous data. At step 700, the base station determines if there is extended paging information for transmission to the mobile station. If not, at step 702, the base station inserts a portable identification (PID) in the A-field and control continues at step 710. If at step 704, there is extended paging information, at step 704, the base station inserts an escape with the PID and the extended paging information in the A-field. At step 706, the base station determines if there is more extended paging information. There will be more extended paging information if the fixed size of the A-field is not sufficient to contain all of the extended paging information, so that the additional extended paging information must be continued in the A-field of a subsequent time slot. If there is not more extended paging information, control continues at step 710. If there is more extended paging information, at step 708 the base station inserts an extended flag into the A-field to indicate to the receiving mobile station that additional extended paging information will follow in a subsequent time slot. At step 710, the base station transmits the formatted packet with the A-field and the B-field, preferably in a P80 high capacity packet.

At step 712, the base station determines if the transmission is to be acknowledged by the receiving base station. The acknowledgment may be an acknowledgment message transmitted after receipt of each packet or after receipt of an End of Packet sequence from the base station. If no acknowledgment message is expected, control returns to step 700 for formatting of the next packet.

If an acknowledgment is expected, at step 714 the base station listens on the next half slot for the acknowledgment message ACK. The base station determines at step 716 if the acknowledgment message is received. If so, at step 718 the base station determines if there are more packets to send. If so, control returns to step 700 for formatting of the next packet. If not, control returns to step 600 (FIG. 6A). If at step 716 the acknowledgment message was not correctly received, the base station determines at step 720 if all attempts at re-transmitting the packet are exhausted. If so, control passes to step 718 to determine if there are more packets to send. If all attempts at re-transmitting the packet are not exhausted, control returns to step 700 for formatting and transmitting the packet.

Throughout the steps illustrated in FIGS. 6–7, the base station continues to monitor its time base. The base station must transmit the isochronous beacon at the start of each frame. Therefore, the base station must ensure there is sufficient time to configure itself to transmit the beacon. The base station will transmit a packet (step 710) only if there is adequate time before the transmission time of the next isochronous beacon for the base station to receive an acknowledgment message, if one is expected.

Figure 7A:
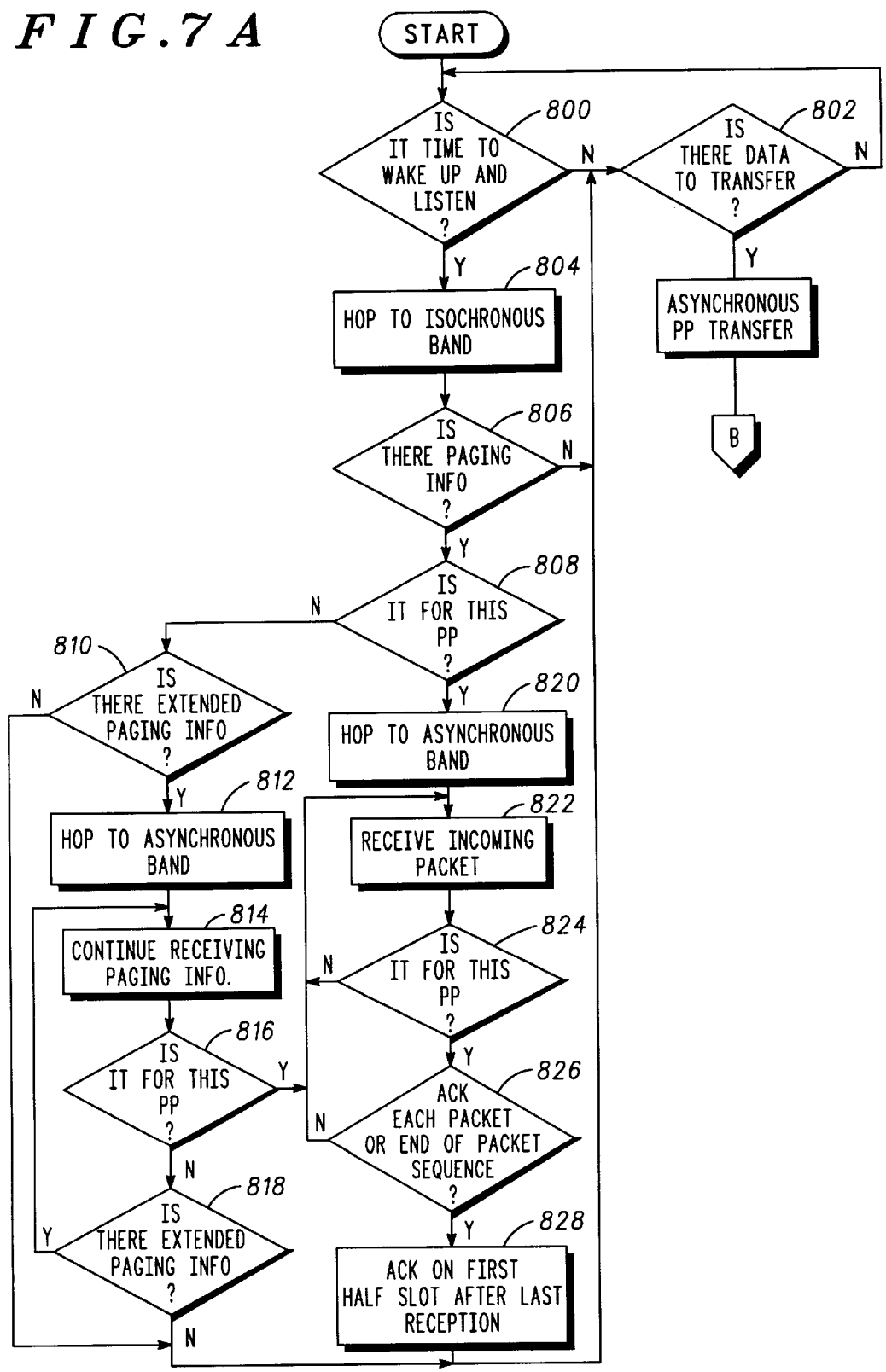
FIGS. 7A and 7B are a flow diagram illustrating operation of a mobile station in the communication system of FIG. 1.

FIG. 7A is a flow diagram illustrating operation of a mobile station in the communication system of FIG. 1. The mobile station is also referred to as a portable part or PP. It is assumed that the mobile station is initially synchronized to the base station and has registered with the base station. It is also assumed that, for conservation of energy in the battery which powers the mobile station, the mobile station remains in a low power sleep mode when not actively transmitting or receiving data.

Figure 7B:
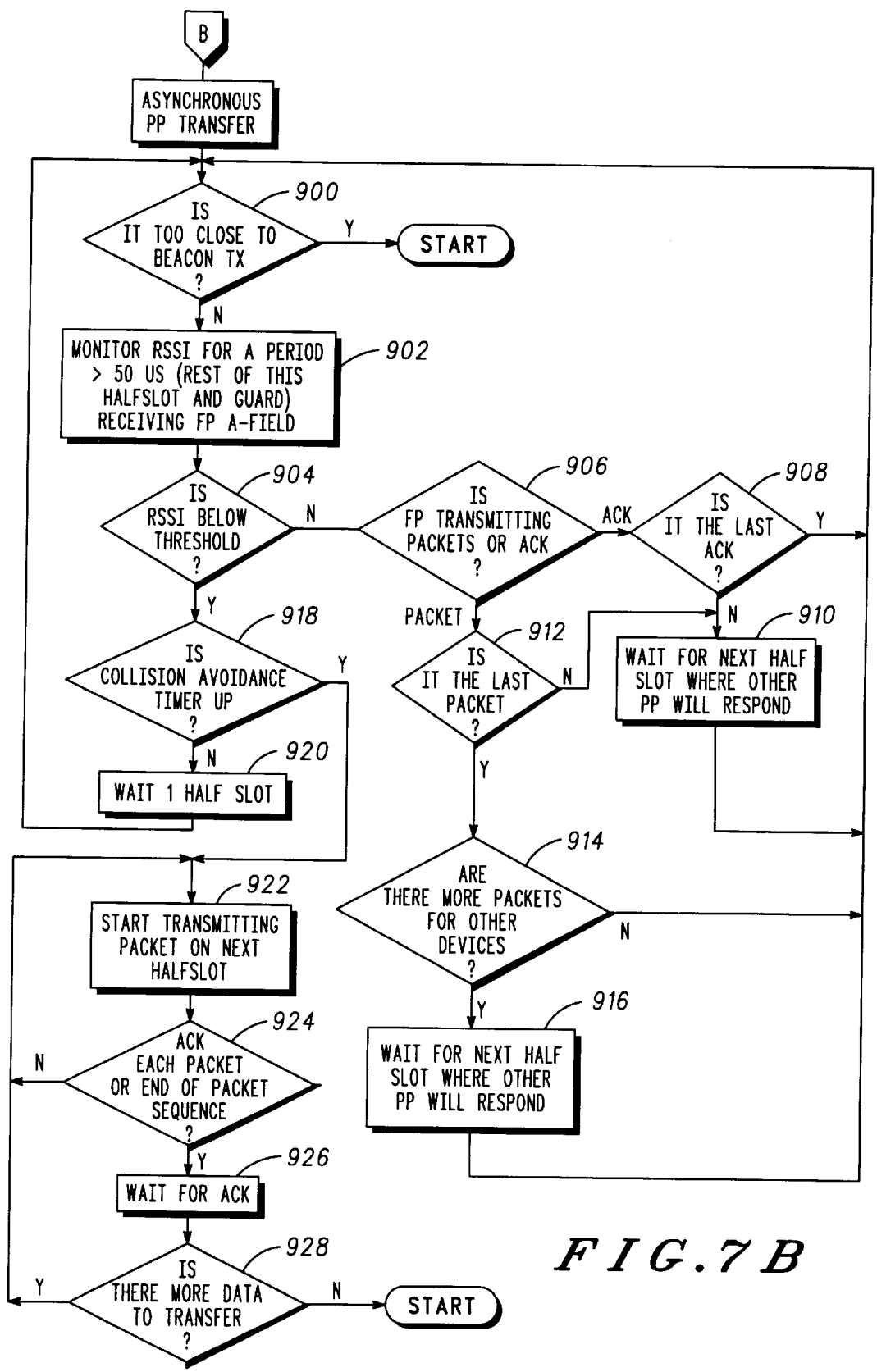

At step 800, the mobile station determines if it is time to listen for a transmission, such as the isochronous beacon, from the base station. If not, the mobile station determines in step 802 if the mobile station has asynchronous data to transfer to the base station. If not, control returns to step 800. If there is asynchronous data to transfer, control proceeds to step 900 (FIG. 7B).

If, at step 800, the mobile station determined it is time to listen for the isochronous beacon, at step 804 the mobile station hops to the isochronous band and receives the isochronous beacon. If isochronous data and asynchronous data are transmitted on the same bands, step 804 is omitted. At step 806, the mobile station determines if the beacon contains paging information. If not, there is no information in this frame for the mobile station and control proceeds to step 802. If there is paging information, at step 808 the mobile station determines if the paging information is addressed to the mobile station, or to another mobile station. Since the isochronous beacon is broadcast to all mobile stations, the mobile station must determine if the paging information is addressed to the mobile station.

If the paging information is not for the mobile station, at step 810 the mobile station determines if there is extended paging information. If not, control proceeds to step 802. If there is extended paging information, the mobile station hops to the asynchronous band at step 812 to continue receiving paging information at step 814. At step 816, the mobile station determines if the paging information is for the mobile station or for another mobile station. If for this mobile station, control proceeds to step 822 to receive the incoming packet on the asynchronous band. If the detected extended paging information is for another mobile station, at step 818, the mobile station determines if there is more extended paging information. If not, control proceeds to step 802. If there is more extended paging information, control returns to step 814 to continue receiving paging information.

If at step 808, paging information is identified for the mobile station, at step 820 the mobile station hops to the asynchronous band and receives an incoming packet at step 822. The mobile station determines if the packet is addressed to the mobile station. If not, the packet is discarded and control returns to step 822 to receive a subsequent packet. If the packet is addressed to the mobile station, the mobile station determines if an acknowledgment message after each packet or after an End of Packet sequence is expected by the transmitting base station. If not, control returns to step 822 to receive a subsequent packet. If so, the acknowledgment message is sent at step 828 and control returns to step 802.

If, at step 802, the mobile station determines there is asynchronous data to transfer to the base station, the mobile station begins an asynchronous data transfer method illustrated in FIG. 9. The method begins at step 900 in which the base station determines if the current time is too close to the time when the base station will transmit the isochronous beacon. If so, the method returns to step 800 to await the isochronous beacon. If not, at step 902, the mobile station monitors received signal strength (RSSI) during a listen time in accordance with the listen before transmit protocol. At step 904, the mobile station determines if RSSI is below a predetermined threshold, to ensure that no other station is transmitting on the asynchronous band.

If RSSI is not below the threshold, this indicates that another station is transmitting. At step 906, the mobile station determines if the base station is transmitting a data packet or an acknowledgment message. If it is an acknowledgment message, at step 908 the mobile station determines if it is the last acknowledgment message. At step 910, the mobile station waits for the next half slot, when another mobile station for which the acknowledgment message is addressed will respond. If it is not the last acknowledgment message, control returns to step 900. If the base station is transmitting a data packet, at step 912 the mobile station determines if the packet is the last packet. If not, control proceeds to step 910. If so, at step 914 the mobile station determines if there are more packets for other stations in the system. If not, control returns to step 900. If there are more packets, the mobile station at step 916 waits for the next half slot, when another mobile station for which the packet is addressed will respond.

If, at step 904, RSSI was below the threshold, at step 918 the mobile station determines if a collision avoidance timer has expired. The collision avoidance timer is a timer maintained by the mobile station. If the collision avoidance timer has not expired, the mobile station waits one half slot at step 920 and control then returns to step 900. If the collision timer has expired, at step 922 the mobile station transmits a first packet beginning at the next half slot. At step 924, the mobile station determines if the base station should respond with an acknowledgment message at the end of each packet or if the base station should respond with an End of Packet message. If not, control returns to step 922 to transmit another packet. If an acknowledgment message is expected, at step 926 the mobile station awaits the acknowledgment message. After receipt of the acknowledgment message, at step 928 the mobile station determines if there are more data packets to transfer. If so, control returns to step 922 to transmit another packet. If there is no more data to transfer, control returns to step 800 (FIG. 7A).

As can be seen from the foregoing, the present invention provides a communication system and method for efficiently communicating both asynchronous data and isochronous data. An isochronous beacon is transmitted at the start of each frame by a base station to provide control information and timing for all stations in the communication system. In response to the beacon, isochronous data is communicated with mobile stations on designated isochronous time slots. Following the isochronous time slots, the remainder of the frame is used for communication of asynchronous data. This protocol permits flexibility, as the communication system is able to accommodate variable amounts of both isochronous data and asynchronous data. Additional isochronous time slots may be allocated if necessary to accommodate additional isochronous data channels. Similarly, the bandwidth allocated to asynchronous data may be maximized in the absence of isochronous data and tailored to the number of isochronous data channels required. Priority is given to communication of isochronous data, which is real-time data.

While a particular embodiment of the present invention has been shown and described, modifications may be made. For example, while the exemplary embodiment has been implemented using elements of the DECT protocol, other communications protocols may be used in conjunction with the disclosed invention. It is therefore intended in the appended claims to cover all such changes and modifications which fall within the true spirit and scope of the invention.

What is claimed is:

1. A method for radio frequency communication of isochronous data and asynchronous data in a communication system, the method comprising the steps of:

(a) broadcasting an isochronous beacon at a predetermined frequency;

(b) thereafter, communicating isochronous data on an isochronous frequency band during one or more isochronous time slots, the one or more isochronous time slots having predetermined timing and slot structure;

(c) hopping from the isochronous frequency band to an asynchronous frequency band having access slots synchronized to the isochronous beacon, wherein the asynchronous frequency band is a different frequency band from the isochronous frequency band; and (d) following communication of isochronous data, communicating asynchronous data on the asynchronous frequency band until the isochronous beacon is next broadcast.

2. A method for radio frequency communication as recited in claim 1 wherein the method further includes the steps of:

(e) providing at a base station a base transmitter and a base receiver configured for communicating on both the isochronous frequency band and the asynchronous frequency band; and (f) providing at a mobile station a transmitter and a receiver configured for communicating on both the isochronous frequency band and the asynchronous frequency band.

3. A method for radio frequency communication as recited in claim 2 wherein step (b) comprises the steps of:

(b1) tuning the base station transmitter to a frequency of the isochronous frequency band;

(b2) at the base station, after broadcasting the isochronous beacon on the frequency of the isochronous frequency band, tuning the base station receiver to a frequency of the asynchronous frequency band; and (b3) during a listen time interval, monitoring the frequency of the asynchronous frequency band for receipt of asynchronous data.

4. A method for radio frequency communication of isochronous data and asynchronous data in a communication system, the communication system including a base station and at least one mobile station which communicate according to a predefined communication protocol, the predefined communication protocol including communication frames occurring at predetermined frequencies in an isochronous frequency band and an asynchronous frequency band, the communication frames including a plurality of predefined time slots, the method comprising the steps of:

at the base station,
at a predetermined location in each communication frame, broadcasting on a frequency of the isochronous frequency band an isochronous beacon to the at least one mobile station;
after broadcasting the isochronous beacon, monitoring one or more frequencies of the asynchronous frequency band for receipt of asynchronous data from one or more mobile stations for a predetermined time;
if no asynchronous data is received during the predetermined time, transmitting on a frequency of the asynchronous frequency band one or more packets of asynchronous data to a mobile station; and at the mobile station,
receiving on the frequency of the asynchronous frequency band the one or more packets of asynchronous data, wherein access slots of the asynchronous frequency band are synchronized to the isochronous beacon.

5. A method as recited in claim 4 wherein the step of transmitting comprises the steps of, at the base station, transmitting paging information with the one or more packets of asynchronous data, the paging information identifying the mobile station.

6. A method as recited in claim 4 wherein the step of transmitting comprises the steps of:

transmitting a packet of asynchronous data;
receiving an acknowledgment from the mobile station;
if there is time before the base station transmits a next isochronous beacon, transmitting a next packet of asynchronous data; and
if not, transmitting the next isochronous beacon.

7. A method as recited in claim 4 wherein the step of transmitting comprises the steps of:

transmitting a packet of asynchronous data;
if there is time before the base station transmits a next isochronous beacon, transmitting a next packet of asynchronous data; and
if not, transmitting the next isochronous beacon.

8. A method as recited in claim 4 further comprising the steps of:

at a mobile station,
receiving the isochronous beacon;
determining from the isochronous beacon if the base station identifies isochronous data for transmission from the base station to the mobile station;
if so, receiving the isochronous data during preassigned time slots; and
if not, communicating asynchronous data with the base station.

9. A method as recited in claim 8 wherein the step of communicating asynchronous data comprises the steps of:

at the mobile station,
determining if the base station and another mobile station are transmitting asynchronous data;
if not, transmitting one or more packets of asynchronous data to the base station;
if so, waiting until no other mobile station and the base station are transmitting asynchronous data before transmitting one or more packets of asynchronous data to the base station; and at the base station,
receiving the one or more packets of asynchronous data.

10. A method as recited in claim 9 wherein the step of transmitting includes the steps of:

transmitting a packet of asynchronous data;
receiving an acknowledgment from the base station;
if there is time before the base station transmits a next isochronous beacon, transmitting a next packet of asynchronous data; and
if not, awaiting reception of the next isochronous beacon.

11. A method as recited in claim 9 wherein the step of transmitting includes the steps of:

transmitting a packet of asynchronous data;
if there is time before the base station transmits a next isochronous beacon, transmitting a next packet of asynchronous data; and
if not, awaiting reception of the next isochronous beacon.

12. A communication system comprising:

at least one base station including a base transmitter and base receiver configured for communicating both asynchronous data on an asynchronous frequency band and isochronous data on an isochronous frequency band, wherein the isochronous frequency band is a different frequency band from the asynchronous frequency band; and at least one mobile station including a transmitter and receiver configured for communicating both asynchronous data on the asynchronous frequency band and isochronous data on the isochronous frequency band, wherein the at least one base station broadcasts an isochronous beacon to the at least one mobile station and the asynchronous frequency band includes access slots synchronized to the isochronous beacon.

13. A communication system as recited in claim 12 wherein the at least one base station further comprises a wireline interface configured for wireline communication, the base transmitter and base receiver being coupled to the wireline interface for communicating voice data between the wireline interface and the at least one mobile station on the isochronous frequency band and for communicating asynchronous data between the wireline interface and the at least one mobile station on the asynchronous frequency band.

14. A communication system as recited in claim 13 wherein the at least one base station and the at least one mobile station comprises a cordless telephone system.

15. A communication system as recited in claim 12 wherein the at least one mobile station comprises a portable computer.

* * * * *